United States Patent [19]

Van Reijmersdal

[11] Patent Number: 4,591,690

[45] Date of Patent: May 27, 1986

[54] WELDING ELECTRODE HOLDER

[75] Inventor: Joseph J. A. Van Reijmersdal, Dordrecht, Netherlands

[73] Assignee: De Vlamboog B.V., Hoofddorp, Netherlands

[21] Appl. No.: 671,162

[22] Filed: Nov. 13, 1984

[30] Foreign Application Priority Data

Nov. 14, 1983 [NL] Netherlands ............... 8303890

[51] Int. Cl.$^4$ ............................................. B23K 9/28
[52] U.S. Cl. ..................................... 219/138; 219/142
[58] Field of Search ............... 219/138, 140, 142, 143, 219/144, 136, 75

[56] References Cited

U.S. PATENT DOCUMENTS 3,493,719  2/1970  Cribb .................................. 219/142

FOREIGN PATENT DOCUMENTS 2605628  8/1976  Fed. Rep. of Germany ...... 219/144
696535  10/1965  Italy ................................. 219/138
111006   4/1965  Netherlands ...................... 219/142

Primary Examiner—Clarence L. Albritton
Assistant Examiner—Catherine M. Sigda
Attorney, Agent, or Firm—C. O. Marshall, Jr.

[57] ABSTRACT

An electrode holder comprises an electrically insulating tubular handle having at one end an axially outward directed bearing surface. An electrode-clamping head member is rotatably seated on such bearing surface, and a cable connector is axially slidable in the tubular handle and has an axially-extending threaded pin portion screwed into a portion of the head member. A coil spring surrounds such pin portion and is arranged to retract the cable connector into the tubular handle so as to hold the head member against the bearing surface. A radially-effective pressure spring is arranged to act between one side of the cable connector and the inner wall of the tubular handle so as to press the other side of the cable connector against the inner wall of the tubular handle.

6 Claims, 3 Drawing Figures

U.S. Patent
May 27, 1986
4,591,690
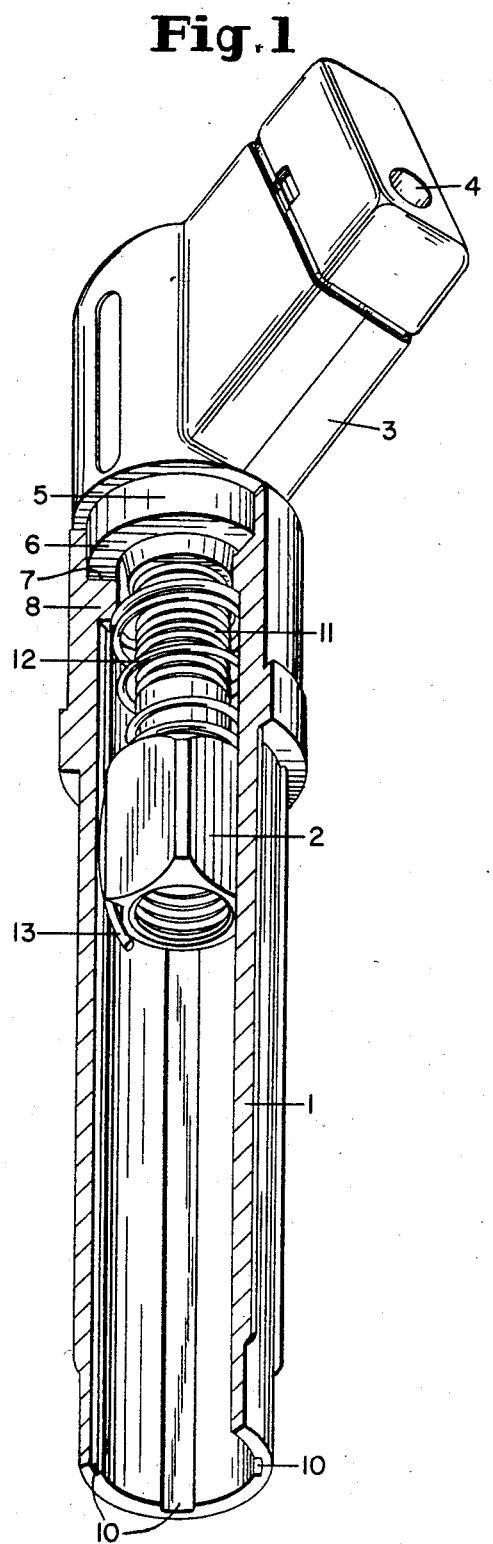
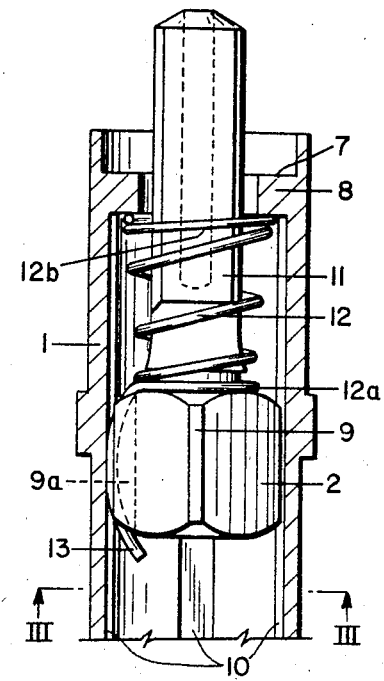
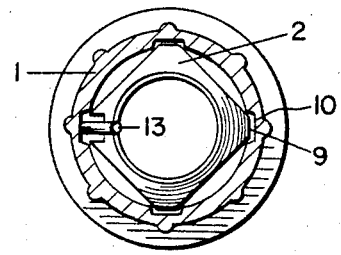

WELDING ELECTRODE HOLDER

This invention relates to an electrode holder comprising an electrically insulating tubular handle, a head member accommodating electrode clamping means provided at one end of said handle and rotatingly supported by an axially outwardly directed bearing surface of said handle, and a cable connector which is axially slidingly mounted within said handle, said connector having a threaded pin shaped portion, which is screwed in a corresponding hole of said head member, a coil spring surrounding said pin shaped portion and engaging a holding surface formed within said handle and directed in a direction turned away from said head portion.

Such an electrode holder is known from NL-A-8104707. It is an advantage of this well-known electrode holder in comparison with other well-known electrode holders, that when the handle is turned relative to the head member, the coil spring keeps the latter lying on the axially outwardly directed bearing surface of the handle, so that, when the head member is turned in the unloosening direction the forming of a gap between the head member and the handle and consequently the exposure of current conducting parts of the electrode holder is avoided.

This advantage has been obtained due to the axial slidability of the cable connector within the tubular handle. For a proper functioning of the electrode holder a certain minimum clearance between the inner wall of the tubular handle and the cable connector is required. On the other hand a relatively large clearance may result in a less reliable functioning of the electrode holder. Tests have shown, that especially in case of relatively heavy electrodes, a relatively large clearance between handle and cable connector may cause the cable connector to tilt within the handle, as a consequence of which the friction contact between the head member and the bearing surface of the handle—which should secure the head member from undue loosening—will be reduced quite considerably, so that an undesired turning movement of the head member relative to the handle may yet occur more or less spontaneously. It will be understood, that such a turning movement would be highly undesirable during welding.

The invention aims at overcoming this objection without the need for taking special measures to keep the clearance between the cable connector and the handle between narrow limits, as this would be hardly realizable in connection with the type of pressing method which is commonly used in the manufacture of the tubular handle.

In accordance with the invention the aim just referred to is achieved in a simple and effective way in that a radially effective pressure spring means is provided between a sidewall of the cable connector and the opposite inner wall of the handle.

Due to this pressure spring means the clearance between the cable connector and the handle will be kept constantly at the same location, so that a swinging movement of the electrode holder together with the electrode carried by it will cause no tilting of the cable connector so that the frictional engagement between head member and handle will not be influenced anymore and consequently there will be no danger for an undesired unloosening movement of the head member.

Preferably the pressure spring means is accommodated, while projecting radially outwardly, in a recess of the wall of the cable connector.

According to a further feature of the invention the pressure spring means is formed by a spring member which is placed under a radially outwardly directed pretension and is accommodated in a longitudinal groove in the wall of the cable connector.

In a preferred embodiment of the invention the spring member is constituted by the terminal end portion of the coil spring turned away from the head member and bent from the plane of the respective terminal coil winding so as to extend in the axial direction.

The invention will be hereinafter further described by way of example with reference to the accompanying drawing in which:

FIG. 1 is a perspective view of the electrode holder according to the invention;

FIG. 2 is a longitudinal cross-sectional view through a part of the handle showing the cable connector contained in it and FIG. 3 is a cross-sectional view according to the line III—III of FIG. 2.

The electrode holder shown in the drawing comprises a tubular handle 1, a cable connector 2 and a head member 3. Within the head member 3, which is provided with electrically insulating walls, clamping jaws (not shown in the drawing) are provided, by means of which a welding electrode to be inserted through the opening 4 may be clamped. The head member 3 has a neck portion 5 having its downwardly facing end face 6 bearing on the upper face 7 of a supporting collar 8 which extends from the inner wall of the tubular handle 1 radially inwardly.

The cable connector 2 is formed as a block with a square cross-sectional shape and the ribs 9 of which are slightly flattened and engage into corresponding longitudinal grooves 10 of the tubular handle 1. The cable connector 2 has a pin-shaped, threaded extension 11, which, in the assembled holder (FIG. 1) is screwed in a corresponding threaded hole in the neck portion 5 of the head member 3. A coil spring 12 surrounds the pin-shaped extension 11, the upper terminal winding of which engages the lower face of the supporting collar 8 and the lower terminal winding of which engages the upper face of the block-shaped cable connector 2.

It will be clear that when turning the head member 3 clockwise, as seen from above in FIG. 1, the pin-shaped portion 11 will be screwed deeper into the head member, while the cable connector 2 slides within the tubular handle 1 upwardly. The coil spring 12 keeps the head member 3 with its neck portion 5 pressing on the supporting collar 8, the friction between the faces 6 and 7 being such, that the head member is prevented from performing a spontaneous turning movement in use.

The slidability of the cable connector 2 within the tubular handle 1 requires a certain minimum clearance. When this clearance, e.g. as a result of the manufacturing tolerances of the handle 1 consisting of a special plastics material, would turn out to be rather large, it may occur, that when the electrode holder with the electrode clamped therein is subjected to a rather abrupt movement, there will be a lateral movement of the cable connector 2 relative to the handle 1. Such a movement will involve loss of contact between the faces 6 and 7, consequently danger for an undesired turning movement of the head member.

With the electrode holder shown in the drawing this danger is avoided in that a spring means is provided between one side of the cable connector 2 and the opposite wall portion of the handle 1, which spring means acts to keep the total clearance on said one side. In the embodiment shown in the drawing said spring means 13 forms part of the coil spring 12. More specifically said spring means is formed by bending the terminal end portion of the coil spring from the plane of the lower coil winding 12a axially downwardly. The spring means thus obtained is slightly convex in shape when seen radially outwardly and is locked in a longitudinal groove 9a formed at one of the ribs 9 of the cable connector 2. The portion of the spring means 13 extending radially outwardly beyond said groove 9a engages the corresponding groove 10 of the cable connector 2. The spring means 13 engages the bottom of said groove 10 under pretension and consequently presses the connector 2 as seen in the drawing, via the lower coil winding 12a fitting snugly onto the lower end of the pin-shaped portion 11, to the right, so that the total clearance between connector 2 and handle 1 remains on the side of the spring means 13.

The spring means 13 also forms an effective means to prevent the cable connector 2 from dropping unduly from the handle in case the head member 3 is completely screwed off the pin-shaped portion 11. In connection herewith it is remarked, that the cable connector 2 will then be pushed back in the tubular handle 1 by the completely relaxing coil spring 12 to the extent that the upper end of the pin-shaped portion 11 has been lowered to adjacent the level of the supporting collar 8. This security effect is further amplified in that the upper coil winding 12b has, in untensioned state, a slightly larger diameter than the inscribed circle of the handle 1 adjacent the supporting collar 8, so that the winding 12b is radially clampingly engaging the inner wall of the tubular handle 1.

I claim:

1. An electrode holder comprising an electrically insulating tubular handle having at one end an axially outward directed bearing surface, an electrode-clamping head member rotatably seated on such bearing surface, a cable connector which is axially slidable in the tubular handle and which has an axially-extending threaded pin portion screwed into a portion of the head member, and a coil spring which surrounds such pin portion and which is arranged to retract the cable connector into the tubular handle so as to hold the head member against said bearing surface, characterized in that a radially-effective pressure spring means is arranged to act between one side of the cable connector and the inner wall of the tubular handle so as to press the other side of the cable connector against the inner wall of the tubular handle.

2. An electrode holder according to claim 1, characterized in that the pressure spring means is positioned, while projected radially outwardly, in a recess of the wall of the cable connector.

3. An electrode holder according to claim 2, characterized in that the pressure spring means is formed by a spring lever which is placed under a radially outwardly directed pretension and which is positioned in a longitudinal groove in the wall of the cable connector.

4. An electrode holder according to claim 3, characterized in that a spring lever is constituted by the terminal end portion of the coil spring turned away from the head member and bent from the plane of the respective terminal coil winding so as to extend axially of the handle.

5. An electrode holder according to claim 4, characterized in that the terminal end portion of the coil spring is convex in shape when seen radially outwardly.

6. An electrode holder according to claim 4 in which the cable connector is substantially rectangular in transverse section and has its corners guided in internal grooves extending longitudinally in the tubular handle, characterized in that the pressure spring means is positioned in a groove extending along one corner of the cable connector and has a portion extending radially outward beyond the latter grooe into one of said internal grooves.

* * * * *